(12) United States Patent
Akechi et al.

(10) Patent No.: US 11,308,376 B2
(45) Date of Patent: Apr. 19, 2022

(54) EQUIPMENT MANAGEMENT SYSTEM

(71) Applicant: JFE Steel Corporation, Tokyo (JP)

(72) Inventors: Yoshihiro Akechi, Tokyo (JP); Motoki Takada, Tokyo (JP); Kenta Karube, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 16/764,271

(22) PCT Filed: Nov. 28, 2018

(86) PCT No.: PCT/JP2018/043803
§ 371 (c)(1),
(2) Date: May 14, 2020

(87) PCT Pub. No.: WO2019/107420
PCT Pub. Date: Jun. 6, 2019

(65) Prior Publication Data
US 2020/0401861 A1 Dec. 24, 2020

(30) Foreign Application Priority Data

Nov. 28, 2017 (JP) .............................. JP2017-227580

(51) Int. Cl.
*G06K 17/00* (2006.01)
*H04W 4/029* (2018.01)
(Continued)

(52) U.S. Cl.
CPC ..... *G06K 17/0022* (2013.01); *G06K 19/0723* (2013.01); *H04W 4/029* (2018.02); *H04W 4/80* (2018.02)

(58) Field of Classification Search
CPC .......... G06K 17/0022; G06K 19/0723; H04W 4/029; H04W 4/80
See application file for complete search history.

(56) References Cited

U.S. PATENT DOCUMENTS 7,496,486 B1* 2/2009 Tracey ................... G06Q 10/08
340/572.2
2004/0069851 A1* 4/2004 Grunes .............. G06K 7/10386
235/435

(Continued)

FOREIGN PATENT DOCUMENTS

JP 2002230675 A 8/2002
JP 200815576 A 1/2008

(Continued)

OTHER PUBLICATIONS

International Preliminary Report on Patentability and Written Opinion for International Application No. PCT/JP2018/043803 dated Feb. 5, 2019, 9 pages.

(Continued)

Primary Examiner — Joseph H Feild
Assistant Examiner — Rufus C Point
(74) Attorney, Agent, or Firm — RatnerPrestia

(57) ABSTRACT

An equipment management system is provided with an RFID provided for each equipment, an equipment position information storage unit, an equipment management data storage unit, an image information storage unit, a reader/writer, and a portable information terminal transmitting and receiving information with each storage unit. The image information storage unit has point group information and other image information of the inside of a facility. The equipment position information storage unit has installation position information of the equipment associated with the RFID and a virtual tag allowing reference to equipment management data on the equipment management data storage unit corresponding to the equipment and the image information associated with the equipment associated with the RFID in the image information storage unit. The portable information terminal has a confirmation information acquisition unit capable of acquiring information of the virtual tag (Continued)

corresponding to the RFID based on information from acquired RFID.

10 Claims, 4 Drawing Sheets

(51) Int. Cl.
*H04W 4/80* (2018.01)
*G06K 19/07* (2006.01)

(56) References Cited

U.S. PATENT DOCUMENTS

| | | | | | |
|---|---|---|---|---|---|
| 2005/0174235 | A1* | 8/2005 | Davis | ............... | G08G 5/0013 340/8.1 |
| 2006/0074494 | A1* | 4/2006 | McFarland | ............ | H04W 4/33 700/1 |
| 2007/0080930 | A1* | 4/2007 | Logan | ............... | G06Q 10/06 704/E15.045 |
| 2011/0224902 | A1* | 9/2011 | Oi | ............... | H04W 4/029 701/300 |
| 2012/0126000 | A1* | 5/2012 | Kunzig | ............... | B66F 9/24 235/385 |
| 2012/0290591 | A1* | 11/2012 | Flynn | ............... | G06F 16/5866 707/754 |
| 2013/0051671 | A1* | 2/2013 | Barton | ............... | G06T 7/181 382/173 |
| 2013/0063592 | A1* | 3/2013 | Kingsley | ............... | H04N 7/181 348/143 |
| 2013/0247117 | A1* | 9/2013 | Yamada | ............... | H04W 4/029 340/12.5 |
| 2014/0225985 | A1* | 8/2014 | Klusza | ............... | H04N 13/207 348/46 |
| 2014/0350831 | A1* | 11/2014 | Hoffman | ............... | G06Q 10/00 701/117 |
| 2015/0310180 | A1* | 10/2015 | Pattekar | ............... | G16H 40/20 705/2 |
| 2015/0327010 | A1* | 11/2015 | Gottschalk | ............... | G05B 15/02 455/456.1 |
| 2015/0363647 | A1* | 12/2015 | Perez | ............... | G06V 20/20 345/633 |
| 2016/0171862 | A1* | 6/2016 | Das | ............... | G05B 9/02 340/686.1 |
| 2017/0171718 | A1* | 6/2017 | Jeong | ............... | H04W 4/33 |
| 2017/0233231 | A1* | 8/2017 | Gariepy | ............... | B66F 9/0755 701/2 |
| 2017/0273048 | A1* | 9/2017 | Huang | ............... | H04W 64/003 |
| 2018/0004779 | A1* | 1/2018 | Moore | ............... | B65B 59/003 |
| 2018/0121869 | A1* | 5/2018 | Bradley | ............... | G16H 40/20 |
| 2020/0226794 | A1* | 7/2020 | Sugio | ............... | G06T 17/05 |
| 2021/0092305 | A1* | 3/2021 | Miyake | ............... | H04N 17/002 |

FOREIGN PATENT DOCUMENTS

| | | | |
|---|---|---|---|
| JP | 5085520 | B2 | 11/2012 |
| JP | 2013222355 | A | 10/2013 |
| JP | 3189286 | U | 3/2014 |
| JP | 5461265 | B2 | 4/2014 |
| JP | 201478122 | A | 5/2014 |
| JP | 2016192206 | A * | 11/2016 |
| JP | 2016192206 | A | 11/2016 |
| JP | 201791489 | A | 5/2017 |
| KR | 1020100079625 | A | 7/2010 |
| KR | 1020150083480 | A | 7/2015 |
| KR | 1020150107168 | A | 9/2015 |
| KR | 1020170043164 | A | 4/2017 |

OTHER PUBLICATIONS

International Search Report and Written Opinion for International Application No. PCT/JP2018/043803, dated Feb. 5, 2019, 5 pages.
Korean Office Action for Korean Application No. 10-2020-7015304, dated Aug. 9, 2021 with Concise Statement of Relevance of Office Action, 7 pages.

* cited by examiner

EQUIPMENT MANAGEMENT SYSTEM

CROSS REFERENCE TO RELATED APPLICATIONS

This is the U.S. National Phase application of PCT/JP2018/043803, filed Nov. 28, 2018, which claims priority to Japanese Patent Application No. 2017-227580, filed Nov. 28, 2017, the disclosures of these applications being incorporated herein by reference in their entireties for all purposes.

FIELD OF THE INVENTION

The present invention relates to an equipment management system for managing equipment, such as machines and plants, provided in factories and other facilities. The equipment management includes inspection work, setting work, and the like, such as maintenance and operation setting, of equipment, for example.

BACKGROUND OF THE INVENTION

Conventionally, the inspection work of factory equipment is carried out as follows. More specifically, an inspector goes to a factory from an office carrying an inspection sheet, and then performs the inspection of each equipment provided in the factory in order in accordance with the given order. At this time, the inspector records the inspection results (five-sense inspection, values of permanent measurement instrument meters, such as a pressure gauge, a flowmeter, and an ammeter, and the like) and the like in the inspection sheet at a site. Then, when the target inspection is completed, an inspection worker returns to the office, and then operates a personal computer to perform input work of the inspection results in the office.

Herein, in PTL 1, a plant equipment instrument is specified based on equipment related information stored in an RFID attached to the equipment instrument. PTL 1 describes that a maintenance service collects the equipment related information on components required for the maintenance of the specified equipment instrument from a database about the specified equipment instrument, and then prepare component information on the equipment instrument.

Moreover, PTL 2 describes as follows. More specifically, an input unit inputting an identification code and a worksheet sign of an inspection target instrument, a storage unit storing an equipment diagram, a work sheet, and an auxiliary mark as maintenance data while associating them with the identification code and the work sheet sign, a display unit and an output unit outputting the maintenance data, and a control unit searching and updating the maintenance data stored in the storage unit are provided. The control unit searches the maintenance data using the identification code or the work sheet sign as a key, and then sends the searched maintenance data to the display unit and the output unit with a command signal. According to the command signal, the display unit displays the equipment diagram in which the installation place of the inspection target instrument is illustrated and the output unit outputs the work sheet or the auxiliary mark in which the work sheet sign is indicated.

Moreover, PTL 3 describes an inspection system provided with an imaging means imaging an inspection target, a comparison means specifying an instrument corresponding to image information input from the imaging means using shape information of an inspection target Navi DB acquired by an inspection target Navi DB acquisition means, a display control means acquiring monitoring information of the instrument specified by the comparison means from the inspection target NAVI DB, and then displaying the monitoring information so that the monitoring information is overlapped with a place where the instrument is displayed in a display means, and an inspection result registration means registering inspection results of the instrument displayed in the display means as inspection history information while matching the inspection results with identification information of the instrument in response to an operation of an inspector.

Patent Literatures
PTL 1: Japanese Patent No. 5085520
PTL 2: Japanese Patent No. 5461265
PTL 3: JP 2014-78122 A

SUMMARY OF THE INVENTION

As described above, according to the method in which an inspector records inspection results of each equipment in an inspection sheet at a site in a factory, and then inputs the record in a personal computer after returning to an office, a work load in the office is present, and therefore the method has been inefficient.

Moreover, at this time, when an inexperienced worker, such as a newcomer, has performed the management work, it has taken time for the worker to confirm an inspection place or an inspection method or the worker has mistaken the same in some cases. Therefore, a veteran worker has been required to confirm the same or to accompany the inexperienced worker in some cases. Furthermore, it has also been necessary to perform a further inspection in some cases.

Herein, according to the method described in PTL 1, the component information required for the maintenance is acquired by the RFID. However, according to the method described in PTL 1, the RFID cannot be utilized unless equipment where the RFID is installed or the RFID installation position is known. Therefore, the method is not effective for an inexperienced worker, such as a newcomer.

Moreover, the method described in PTL 2 can prevent a wrong operation or an inspection omission of an inspection target instrument. However, according to the method described in PTL 2, a means specifying the inspection target instrument is only the equipment diagram. Therefore, when a plurality of pieces of large and complicated equipment or similar equipment is installed, there has been a possibility that it has taken time to confirm a target equipment or a target equipment is mistaken depending on the experience of a worker.

Moreover, according to the method described in PTL 3, when a worker goes to a place of an inspection target instrument with the AR technology, a human error can be reduced. However, according to the method described in PTL 3, when there is large and complicated equipment or similar equipment, it has taken time to specify a rough place of the inspection target instrument in some cases.

Aspects of the present invention have been made in view of the above-described points. It is an object according to aspects of the present invention to provide a technology which allows even an inexperienced worker to efficiently manage equipment at a site.

In order to solve the problems, an equipment management system of one aspect of the present invention relates to a plurality of pieces of equipment in a facility where the plurality of pieces of equipment is disposed and is provided with a short-distance wireless communication medium installed in the equipment or near the equipment for each management target equipment and storing equipment specific information specifying each corresponding equipment, an image information storage unit storing at least three-dimensional data for images about the inside of the facility, an equipment position information storage unit storing position information data about each equipment disposed in the facility, an equipment management data storage unit storing equipment management data which is management information of each management target equipment, a reader/writer reading/writing information with the short-distance wireless communication medium by short-distance wireless communication, and a portable information terminal transmitting and receiving information with the reader/writer and capable of transmitting and receiving information with the equipment position information storage unit, the equipment management data storage unit, and the image information storage unit, in which the image information storage unit stores at least one image information out of image information of the management target equipment and surrounding image information of the equipment, the equipment position information storage unit is provided corresponding to the short-distance wireless communication medium and has installation position information of the equipment associated with the equipment specific information in the short-distance wireless communication medium and a virtual tag allowing reference to equipment management data in the equipment management data storage unit corresponding to the equipment and image information associated with the equipment in the image information storage unit, and the portable information terminal has a confirmation information acquisition unit capable of acquiring information of the virtual tag corresponding to the short-distance wireless communication medium based on acquired information from the short-distance wireless communication medium.

Herein, in this specification, a wireless-communication range of several millimeters to several meters is assumed as the communication distance of the short-distance wireless communication, for example. As the short-distance wireless communication medium, media, such as an RFID and a BLE, can be mentioned, for example. As the short-distance wireless communication medium, any known instrument is applicable insofar as short-distance wireless communication is allowed.

According to one aspect of the present invention, based on information of the short-distance wireless communication medium read near predetermined equipment, position information data about the equipment corresponding to the short-distance wireless communication medium and the image information related thereto can be acquired. Therefore, one aspect of the present invention enables a worker to confirm the current position in the facility by the position information data or to confirm a surrounding situation by a three-dimensional image. As a result, one aspect of the present invention enables even an inexperienced worker to easily specify target equipment.

Moreover, according to one aspect of the present invention, when the image information includes image information of the equipment itself to be inspected, an inspection target can also be visually confirmed. Particularly in the case of an image in which additional information, such as a direction of an inspection position, is added to the image information, even an inexperienced worker can easily confirm the inspection position and easily understand an inspection method thereof.

Moreover, one aspect of the present invention enables input of inspection information at a site by operating the portable information terminal.

Thus, one aspect of the present invention enables even a newcomer or an inexperienced worker to efficiently perform the confirmation of a place where inspection/repair/construction and the like are performed, acquisition of required information, planning/actual work, and the like anytime and anywhere even in the case of facilities, such as a large factory.

DETAILED DESCRIPTION OF EMBODIMENTS OF THE INVENTION

Embodiments of the present invention will now be described with reference to the drawings.

In a facility, such as a factory, a plurality of pieces of equipment is provided. In this embodiment, a description is given taking a case of managing each equipment as an example. Not all the pieces of equipment in the facility need to be inspected in accordance with aspects of the present invention. The equipment is configured to have a plurality of floors in some cases.

In this embodiment, a description is given taking an RFID as an example of a short-distance wireless communication medium.

(Configuration)

Figure 1:
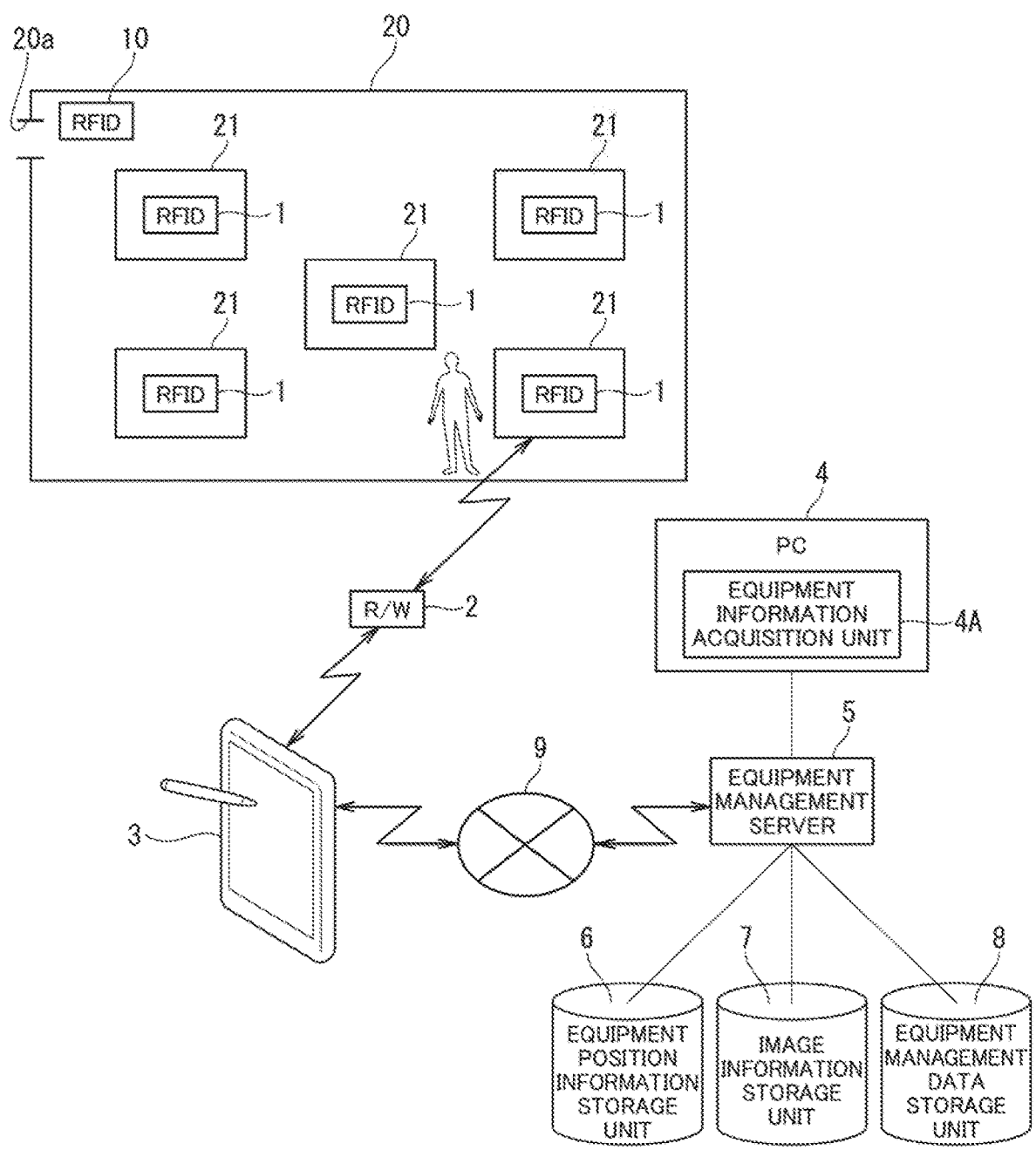
FIG. 1 is a conceptual diagram explaining an equipment management system according to an embodiment based on the present invention.

An equipment management system of this embodiment is provided with RFIDs 1, a reader/writer 2, a portable information terminal 3, a PC 4, an equipment management server 5, an equipment position information storage unit 6, an image information storage unit 7, and an equipment management data storage unit 8 as illustrated in FIG. 1. The PC 4 is a personal computer (computer) for management installed in an office, for example. The portable information terminal 3 may also have a form of also having a function of the reader/writer 2.

Herein, the equipment management system is particularly effective for a large facility. As illustrated in FIG. 1, equipment 21 in a facility 20 is described in a simplified manner. The equipment 21 is also assumed to be configured by a plurality of subunits (a pipe, a roll, a bearing, and the like possessed by the equipment 21). In the following description, the subunit is also referred to as a component.

Each RFID 1 is an RFID tag provided in the corresponding management target equipment 21 or at a position in the vicinity of the equipment 21. As illustrated in FIG. 1, an RFID 10 matched with the facility 20 may be installed in an entrance 20a or the like of the facility 20. Based on information of the RFID 10 for the facility 20, information, such as an in-facility map, can be referred to.

Herein, in this embodiment, the vicinity of the equipment 21 refers to a region in the range apart from the equipment 21 by 2 m and preferably 1 m, for example.

The RFID 1 stores (stores) tag specific information (tag No.) and equipment specific information specifying the equipment 21. The equipment specific information includes an equipment name, a mark (equipment specific No.) attached to the equipment 21 for management, and the like. For maintenance, information stored in the RFID 1 is preferably little.

Figure 2:
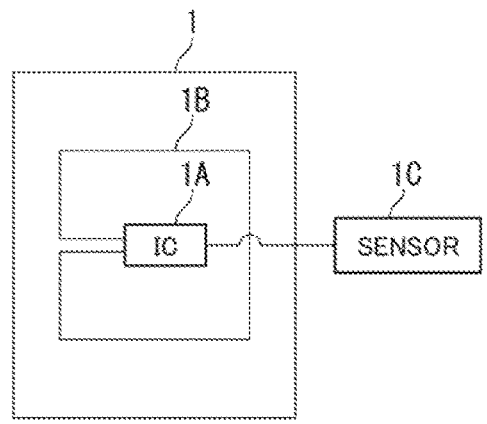
FIG. 2 is a figure explaining an example of an RFID with a sensor.

Herein, at least some RFIDs 1 of the RFIDs 1 may be provided with a sensor 1C for acquiring information of the corresponding equipment 21 as illustrated in FIG. 2. In this case, the RFID 1 has an IC chip 1A, an antenna 1B connected to the IC chip 1A, and a sensor 1C connected to the IC chip 1A. The RFID 1 may have a battery, a memory, and the like. The sensor 1C is an ammeter or the like, for example. In this case, the RFID 1 is capable of transmitting detection information acquired by the sensor 1C to the reader/writer 2 which is communicatively connected thereto. The detection information of the sensor 1C may be a case where the detection information currently detected in real time is transmitted or may be past detection information periodically stored in a storage unit (not illustrated) built in the RFID 1. The IC chip 1A has a memory therein. When the detection information is periodically stored, a battery built-in RFID may be used in the RFID 1.

The equipment position information storage unit 6 is a database/server storing three-dimensional position information data of each equipment in the facility including the management target equipment 21. The three-dimensional position information data is three-dimensional point group data, for example. The equipment position information storage unit 6 has installation position information (coordinate information and the like) of the equipment 21 associated with the RFID 1.

Figure 3:
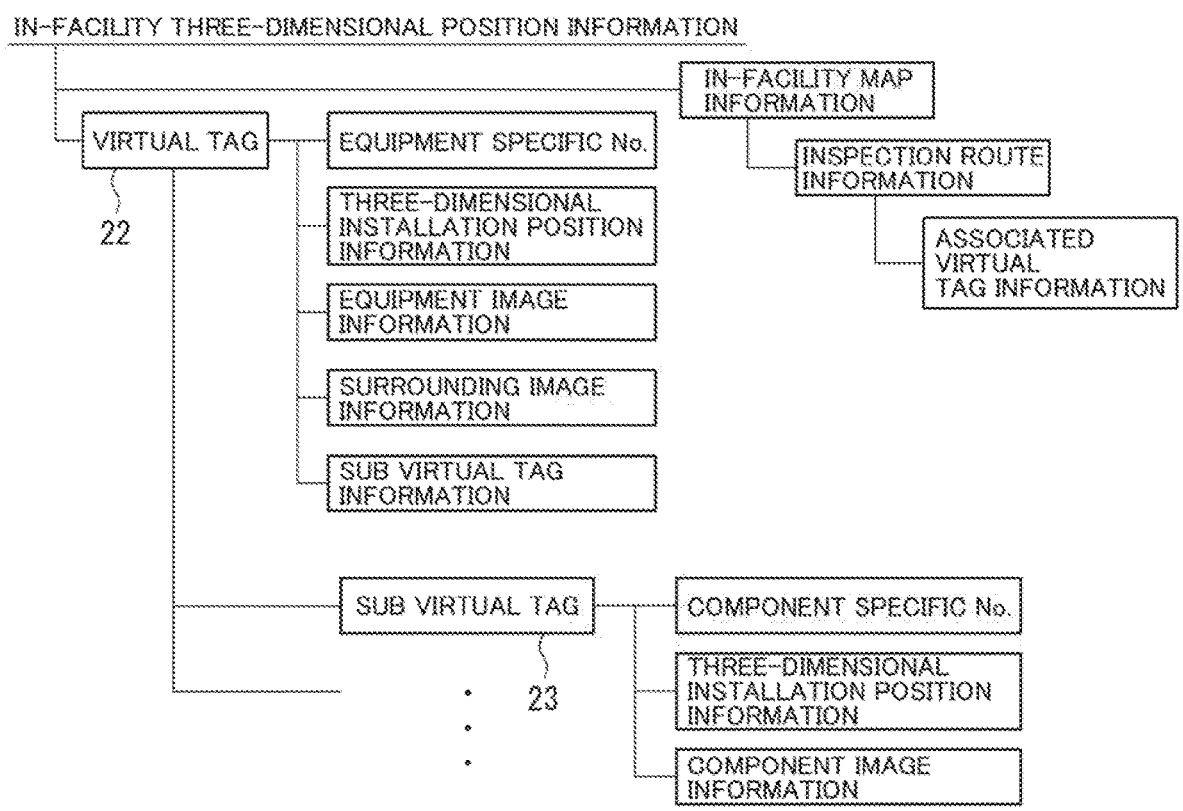
FIG. 3 is a figure illustrating data in an equipment position information storage unit.

The data stored in the equipment position information storage unit 6 has in-facility map information and information of a virtual tag 22 as illustrated in FIG. 3, for example.

The in-facility map information has a map of the inside of the facility 20, information of an inspection route, and virtual tag information related to the inspection route. The virtual tag information is a link to the corresponding virtual tag 22, the order of the virtual tags 22 according to the inspection order, and the like, for example. When a plurality of equipment inspection systems is present in the equipment 21, two or more routes are present as the inspection route.

The virtual tag 22 is provided while being matched with each physical RFID 1, i.e., the equipment 21, as illustrated in FIG. 3, for example. Each virtual tag 22 has, for example, the same equipment specific No. as that of the corresponding RFID 1, three-dimensional installation position information of the equipment 21, installation image information (absence or presence of an image, the number of data, and the like), image information around the equipment 21 (absence or presence of an image, the number of data, and the like), and sub virtual tag 23 information (absence or presence of information, the number of the sub virtual tags 23, inspection turn of the virtual tag 22, and the like). By searching the information of the equipment management data storage unit 8 and the image information storage unit 7 using the equipment specific No. as a key, equipment management data on the equipment management data storage unit 8 corresponding to the equipment 21 associated with the RFID 1 and image data associated with the equipment 21 associated with the RFID 1 in the image information storage unit 7 can be referred to, respectively. More specifically, the information of the installation position information, the equipment management data, and the image data of the corresponding equipment 21 can be searched from the virtual tag 22. The installation image information and the like may be directly provided with link information to the corresponding image data and the like.

Moreover, link information to the virtual tag 22 corresponding to the equipment 21 to be inspected next may be imparted to each virtual tag 22.

The equipment position information storage unit 6 stores the sub virtual tags 23 corresponding to the subunits configuring the equipment corresponding to the RFID 1.

As illustrated in FIG. 3, the sub virtual tag 23 is information linked to one virtual tag 22 stored in the equipment position information storage unit 6 and allowing reference to at least one of the equipment management data on the equipment management data storage unit 8 corresponding to the subunit configuring the equipment 21 related to the linked virtual tag 22 and the image information associated with the subunit in the image information storage unit 7. The information of each sub virtual tag 23 can be referred to from the linked virtual tag 22.

The sub virtual tag 23 has a component specific No. (information specifying the subunit of the equipment 21), three-dimensional installation position information of a component, and component image information (absence or presence of an image, the number of data, and the like), for example.

Although it is difficult to attach the RFID 1 to all the components configuring the equipment, the sub virtual tag 23 enables the portable information terminal 3 to easily acquire information of the components of the equipment 21 related to the acquired virtual tag 22.

The image information storage unit 7 stores at least three-dimensional data for images about the inside of the facility.

By the three-dimensional data for images about the inside of the facility, an image of the inside of the equipment can be visually recognized as a three-dimensional image.

As the image information stored in the image information storage unit 7, at least one image information out of image information of at least management target equipment and surrounding image information of the equipment is stored. Thus, an image of the management target in the equipment can be at least confirmed.

In this embodiment, point group data of the inside of the facility is at least provided as the three-dimensional data for images. The point group data of the inside of the facility can be acquired by measuring the inside and outside of the facility or the inside and outside of the equipment with a 3D scanner or compositing and analyzing a plurality of photographs. The point group data is a group of points having three-dimensional coordinates and color information.

As the image information, actually photographed image information obtained by imaging the inside of the facility may be provided. In this case, by compositing the point group data and the actually photographed image information, a three-dimensional image of the inside of the facility can be displayed while suppressing a processing load. The point group data and the actually photographed image information are information which can be composited with known compositing software.

Figure 4:
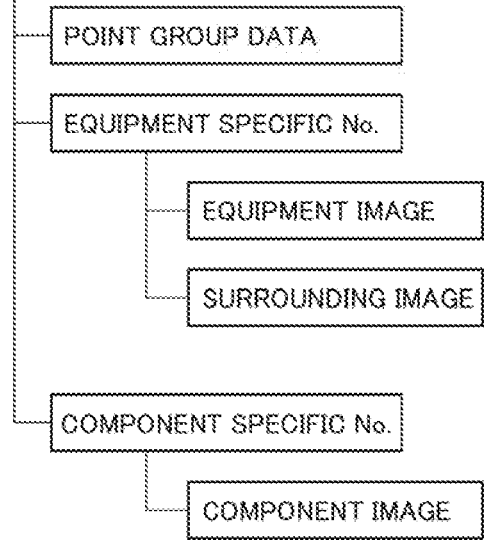
FIG. 4 is a figure illustrating data in an image information storage unit.

A part of the image information stored in the image information storage unit 7 is stored while being imparted with the equipment specific No. and the component specific No. and includes, for example, equipment images about the predetermined equipment 21 (an image obtained by imaging the equipment 21 itself, a three-dimensional image in which the equipment is disassembled and developed, an actually photographed image, and the like) and surrounding images imaging the surrounding of the corresponding equipment 21 (a three-dimensional image, an actually photographed image, and the like obtained by imaging surrounding equipment and the like from the target equipment 21 position) as illustrated in FIG. 4, for example. The image information also includes image history information (three-dimensional image and actually photographed image), such as information of construction/extension/before and after reconstruction, data for grasping equipment deformation/degradation by regularly collected data, and the like.

Figure 5:
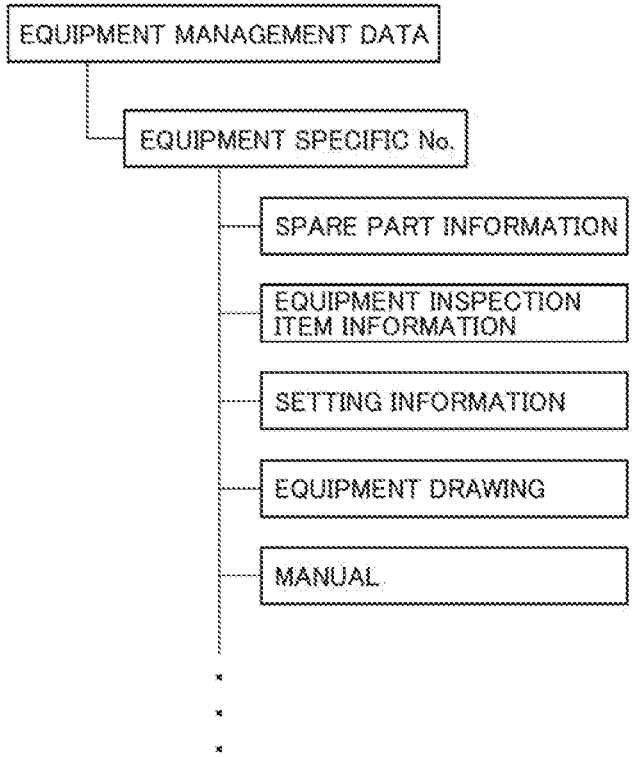
FIG. 5 is a figure illustrating data in an equipment management data storage unit.

The equipment management data storage unit 8 is a database/server storing the equipment management data which is the management information of each equipment 21. As illustrated in FIG. 5, the management information is, for example, spare part information, equipment inspection item information, setting information (setting information of an operation of a device and the like), and document information, such as drawings and manuals of the equipment 21, instruction manuals of equipment which is not illustrated, maintenance standards and histories, construction/instrument masters execution procedure preparations, failure management, condition setting standards (setting standards of switches, valve operations, mechanical stoppers, and the like for safe construction), equipment inspection/measurement results and histories, and operation/maintenance know-how.

The equipment management server 5 is a server managing each data in the equipment position information storage unit 6, the equipment management data storage unit 8, and the image information storage unit 7 and performs transfer processing of information with the portable information terminal 3 through a network 9. The equipment management server 5 performs transfer processing of information also with the PC 4. The equipment management server 5 has a processing unit performing processing, such as data composition. For example, an image in which an inspection route is composited with map data is created based on input information, and then output to the portable information terminal 3 or the PC 4.

The equipment management server 5 performs processing of generating a three-dimensional image with a predetermined coordinate as a reference based on the point group data stored in the image information storage unit 7 or, when a coordinate corresponding to the virtual tag 22 is present in the coordinates in the generated three-dimensional image referring to the equipment position information storage unit 6, generates a three-dimensional image to which an icon of a tag button of the virtual tag 22 corresponding to the position is added. It is preferable to set a link so that, when the icon of the tag button of the virtual tag 22 is clicked, information on the virtual tag 22 can be accessed. The three-dimensional image information thus generated is output to the portable information terminal 3 or the PC 4.

The equipment management system is provided with the reader/writer 2 and the portable information terminal 3 which can be carried by a worker. A function of the reader/writer 2 may be provided to the portable information terminal 3.

The reader/writer 2 is configured to be able to perform short-distance wireless communication with the nearby RFID 1 to read/write information from/in the RFID 1. The distance of the short-distance wireless communication is set within 1 m, within 5 m, and the like, for example. When directivity is imparted to the communication direction, the direction of the connected RFID 1 can be easily specified. Moreover, it can also be determined which RFID 1 is connected from the acquired tag information.

The portable information terminal 3 transmits/receives information with the reader/writer 2 and is connected to the equipment management server 5 through the network 9 to be able to transmit/receive information with each storage unit of the equipment position information storage unit 6, the equipment management data storage unit 8, and the image information storage unit 7 through the equipment management server 5. The personal computer installed in the office can also transmit/receive information with the equipment position information storage unit 6, the equipment management data storage unit 8, and the image information storage unit 7 through the network.

Figure 6:
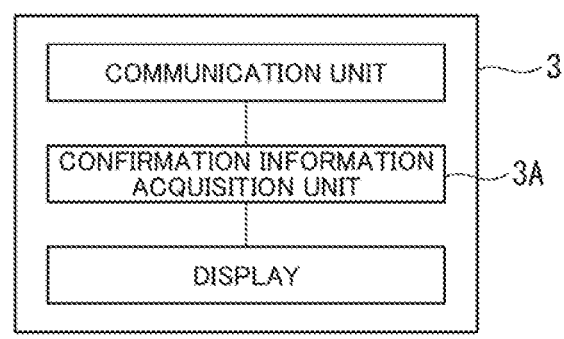
FIG. 6 is a figure explaining a portable information terminal.

Moreover, the portable information terminal 3 has a confirmation information acquisition unit 3A capable of acquiring the information of the virtual tag 22 corresponding to the acquired RFID 1 based on the information of the RFID 1 as illustrated in FIG. 6.

When acquiring the equipment specific information of the RFID 1 read by the reader/writer 2, the confirmation information acquisition unit 3A transmits the equipment specific information (equipment specific No.) of the RFID 1 to the equipment management server 5 through the network 9, and then acquires corresponding virtual tag information from the equipment position information storage unit 6. The acquisition of the corresponding virtual tag information may be a form of an icon, such as the tag button of the virtual tag 22 added to the three-dimensional image as described above. Thus, the confirmation information acquisition unit 3A of the portable information terminal 3 can access the corresponding virtual tag 22, and then acquire the installation position information, the equipment management data, and the image data of the equipment 21 corresponding to the acquired RFID 1 through the virtual tag 22.

Furthermore, when the sub virtual tag 23 is linked to the acquired virtual tag 22, the confirmation information acquisition unit 3A can acquire the equipment management data and the image data about components configuring a part of the corresponding equipment 21 through the sub virtual tag 23.

Herein, the reader/writer 2 may be attached to wearing articles which a worker inspecting the equipment 21 wears. The wearing articles include a work uniform, a helmet, and the like which a worker wears when going inspecting. The reader/writer 2 is attached to a shoulder portion of the work uniform, a side portion of the helmet, or the like.

The personal computer PC 4 for management installed in the office has an equipment information acquisition unit 4A (see FIG. 1).

The equipment information acquisition unit 4A can acquire the installation position information, the equipment management data, and the image data of the equipment 21. Moreover, the equipment information acquisition unit 4A can acquire the three-dimensional image of the facility from the image information of the image information storage unit 7 and display the same. The equipment information acquisition unit 4A may also be configured to acquire a three-dimensional image to which the icon of the tag button of the corresponding virtual tag 22 is added and display the same as described above and to allow the access to the information on the virtual tag 22 by clicking the icon of the tag button of the virtual tag 22. For example, past inspection history information, future inspection information, and two-dimensional or three-dimensional image information on the equipment of the corresponding equipment are acquired by clicking the icon of the tag button of the virtual tag 22.

Thus, three-dimensional images or inspection contents about the facility or the equipment can be confirmed beforehand by operating the personal computer PC 4. When abnormalities are detected by inspection results, the three-dimensional image about the equipment is displayed, and further the image is moved, whereby the confirmation of measures against the abnormalities is facilitated.

(Operation and Others)

It is supposed that an inspection worker goes to the target facility 20 from the office or the other current position carrying the reader/writer 2 and the portable information terminal 3, and goes to the target equipment 21 in the facility 20.

At this time, information of management equipment can be confirmed in advance in the office based on images and the like as described above.

The attachment of the reader/writer 2 to the wearing articles eliminates the necessity of having the reader/writer 2 in a hand or hanging the same from the shoulder. Also when a reader/writer function is imparted to the portable information terminal 3, the same effects are exhibited. However, the enhancement of the function of the portable information terminal 3 is required, so that the portable information terminal 3 correspondingly lacks versatility.

Figure 7:
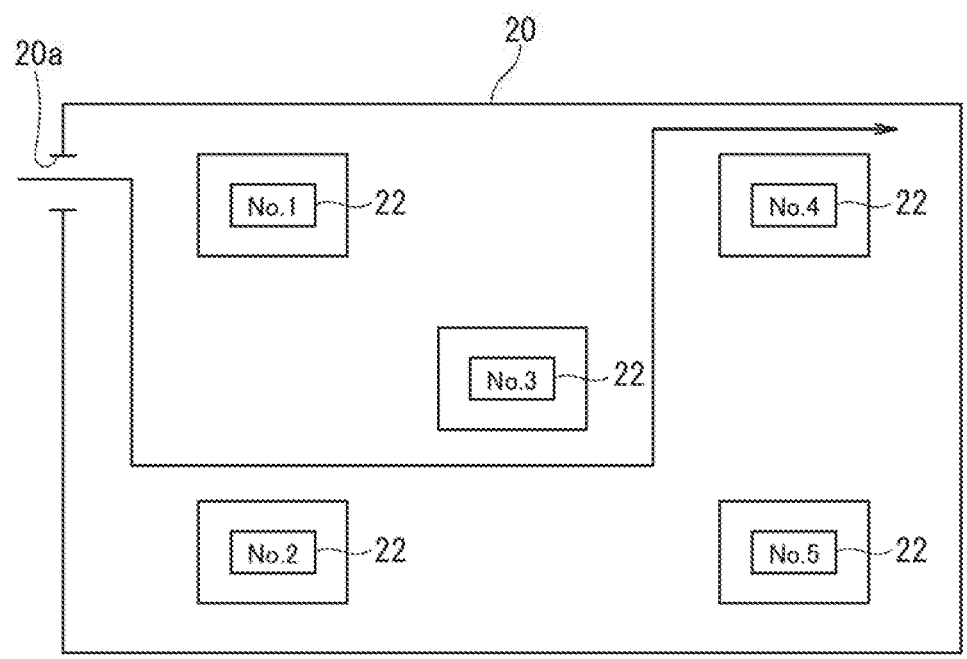
FIG. 7 is a conceptual diagram illustrating an example of an in-equipment map with inspection route guidance.

The inspection worker may perform communication with the RFID 10 for the facility 20 through the reader/writer 2 at a place, such as the entrance 20a of the facility 20, acquire the in-equipment map with inspection route guidance as illustrated in FIG. 7 through the equipment management server 5, and display the same on the screen of the portable information terminal 3, whereby the inspection worker may confirm an inspection route and the position of each RFID 1 (FIG. 7 illustrates the virtual tag 22 corresponding to each RFID 1), i.e., the position of each equipment to be inspected and the turn of the inspection. The information of the in-equipment map with inspection route guidance is enabled when configured so that composition processing is carried out with the equipment management server 5. In FIG. 7, the reference numeral 22 designates the virtual tag 22 corresponding to the RFID. A configuration may be acceptable in which an image is formed in which link information is embedded in the virtual tag 22 in the displayed image so that information of the corresponding virtual tag can be accessed by the virtual tag 22.

When the inspection worker reaches the target equipment 21, and then enters the communication area with the RFID 1 corresponding to the equipment 21, the RFID 1 and the reader/writer 2 automatically communicate with each other, so that the acquisition information from the RFID 1 performing communication is displayed on the screen of the possessed portable information terminal 3 through the reader/writer 2.

Based on the acquired information, for example, equipment inspection item information of the equipment 21 is acquired in the portable information terminal 3, inspection is performed, data of the inspection results is input into the acquired equipment inspection item information, and the data is output to the equipment management server 5. The equipment management server 5 carries out update processing of corresponding data based on the input information.

In the inspection work, the confirmation of the inspection may be performed by acquiring an image of the equipment 21 from the virtual tag 22. In this case, information, such as directions of inspection places and an inspection procedure, may be added into the image to be acquired.

Moreover, by accessing the sub virtual tags 23 linked to the virtual tags 22 in order, the inspection of the subunits can be performed according to a determined inspection order in the subunits to be inspected and the subunits to be inspected can be easily confirmed by an image linked to the sub virtual tag 23. In particular, it is effective when a plurality of similar subunits, such as a plurality of pipes, is arranged or when a subunit present at an unclear position needs to be inspected.

Moreover, by acquiring a surrounding image from the virtual tag 22, the direction of equipment in which the inspection worker goes next can be confirmed. It is preferable to add additional information, such as the name of the equipment 21, in the image also in the surrounding image.

When the next inspection equipment 21 is not clear in the facility, the inspection worker communicates with the nearby RFID 1 to acquire the tag number of the RFID 1 and can confirm the current position by referring to the in-equipment map with inspection route guidance, whereby the inspection worker easily moves to the next equipment 21.

Herein, when inspection information and the like are successively added to each image, the accumulation of operation/maintenance know-how in the image information can be achieved and the information can be easily accessed. The additional information may be directly added to the image or separately accumulated by setting a link to the image information.

Furthermore, due to the possession of the three-dimensional data for images containing the point group data of the inside of the facility and the like, three-dimensional images (still image and moving image) with predetermined equipment as a reference are visually recognized at a site and in the office with the virtual tag 22 associated with the RFID (short-distance wireless communication medium), whereby the inspection can be further facilitated.

Moreover, when abnormalities are detected by on-site inspection, abnormality information is input at a site and a three-dimensional image of an abnormal place is displayed in the office based on information of the equipment where abnormalities are detected by inspection, so that the confirmation of the abnormal place can be easily performed also in the office. Moreover, the image history information can facilitate the grasp of equipment deformation/degradation by the information of construction/extension/before and after reconstruction or periodically collected data, and therefore can be utilized for machine history and safety problems of the equipment, equipment improvement and reconstruction examination, and the like. Furthermore, when equipment three-dimensional data of the image information storage unit 7 is utilized, converted into data for virtual reality (VR), and then stored in the image information storage unit 7, information in the equipment management server 5 including VR information can be confirmed also in the office with a feeling of being present at a site using a head mounted display which is not illustrated.

Herein, although the description above gives the description supposing the case of inspection work, operation setting work of each equipment 21 can also be similarly processed. More specifically, setting work is carried out so that setting conditions (opening degree and the like) acquired by confirming an operation unit to be set by an image are set, for example.

As described above, in this embodiment, even an inexperienced worker can specify an inspection place, a condition setting place, a spare part place, and the like anytime and anywhere in a short time and can search/display documents, such as drawings, operation manuals, maintenance standards and histories, construction/instrument masters execution procedure preparations, failure management, stock management, condition setting standards, equipment inspection/measurement results and histories, and operation/maintenance know-how, anytime and anywhere in a short time.

Furthermore, when the RFID 1 is the RFID 1 possessing a sensing function, sensor measurement data is collected, so that it can be visually confirmed which equipment 21 data relates to the data of the sensor 1C in a short time, and thus even a newcomer or an inexperienced worker can efficiently perform the confirmation of a place where inspection/repair/construction and the like are performed, the acquisition of required information, planning/actual work, and the like anytime and anywhere even in the case of a large factory.

Although it is difficult to install the RFID in all components, such as a rotating roller, images and inspection information about such a component can also be easily acquired by setting the sub virtual tag 23. The sub virtual tag 23 is also set to be displayed on a display unit of the terminal 3 while being added to an image of target equipment as with the image including images of the virtual tags 22 illustrated in FIG. 7. It is preferable to embed link information to target information in the image of the displayed sub virtual tag 23.

The information of the equipment management server 5 linked to the RFID 1, the virtual tag 22, or the sub virtual tag 23 can also be utilized as common management information. The information of the equipment management server 5 enables the management of a unit and equipment in which a specific component is used, the place and the amount of the stock of the specific component, and the like. More specifically, due to the possession of the information of the equipment management server 5, not only individual information management of equipment and components linked to the RFID 1, the virtual tag 22, or the sub virtual tag 23 but information centralized management of the entire factory can be achieved.

As described above, this application claims the benefit of Japanese Patent Application No. 2017-227580 (filed Nov. 28, 2017), the entire contents of which form a part of this disclosure by reference. Although the description is given referring to a limited number of embodiments herein, the scope of the present invention is not limited thereto. It is obvious for those skilled in the art to alter and modify the embodiments based on the disclosure above.

REFERENCE SIGNS LIST

1 RFID
2 reader/writer
3 portable information terminal
3A confirmation information acquisition unit
4 PC
4A equipment information acquisition unit
5 equipment management server
6 equipment position information storage unit
7 image information storage unit
8 equipment management data storage unit
9 network
20 facility
21 equipment
22 virtual tag
23 sub virtual tag

The invention claimed is:

1. An equipment management system relating to a plurality of pieces of equipment in a facility where the plurality of pieces of equipment is disposed, the equipment management system comprising a short-distance wireless communication medium installed in the equipment or near the equipment for each management target equipment and store equipment specific information specifying each corresponding equipment;

an image information storage unit configured to store at least three-dimensional data for images about an inside of the facility, the three-dimensional data for images comprising at least point group data of the inside of the facility, the point group data being a group of points having three-dimensional coordinates and color information;

an equipment position information storage unit configured to store position information data about each equipment disposed in the facility;

an equipment management data storage unit configured to store equipment management data which is management information of each management target equipment;

a reader/writer configured to read/write information with the short-distance wireless communication medium by short-distance wireless communication; and a portable information terminal configured to transmit and receive information with the reader/writer and capable of transmitting and receiving information with the equipment position information storage unit, the equipment management data storage unit, and the image information storage unit, wherein the image information storage unit stores at least one image information out of image information of the management target equipment and surrounding image information of the equipment, the equipment position information storage unit is provided corresponding to the short-distance wireless communication medium and has installation position information of the equipment associated with the equipment specific information in the short-distance wireless communication medium and a virtual tag allowing reference to the equipment management data in the equipment management data storage unit corresponding to the equipment and the image information associated with the equipment in the image information storage unit, and the portable information terminal has a confirmation information acquisition unit capable of acquiring information of the virtual tag corresponding to the short-distance wireless communication medium based on acquired information from the short-distance wireless communication medium, wherein the point group of the inside of the facility is acquired by measuring the inside and outside of the facility or the inside and outside of the equipment with a 3D scanner or compositing and analyzing a plurality of photographs, the image information storage unit has actually photographed image information obtained by imaging the inside of the facility, and the point group data and the actually photographed image information are information capable of displaying a three-dimensional image of the inside of the facility by compositing the point group data and the actually photographed image info.

2. The equipment management system according to claim 1, wherein the short-distance wireless communication medium includes a sensor configured to acquire information of corresponding equipment, and the short-distance wireless communication medium is capable of transmitting detection information acquired by the sensor to the reader/writer.

3. The equipment management system according to claim 1, wherein
the equipment position information storage unit has a sub virtual tag provided corresponding to a subunit configuring the equipment specified by the equipment specific information of the short-distance wireless communication medium, and
the sub virtual tag is linked to one virtual tag in the equipment position information storage unit and allows reference to at least one of the equipment management data in the equipment management data storage unit corresponding to the subunit configuring the equipment related to the linked virtual tag and the image information associated with the subunit in the image information storage unit.

4. The equipment management system according to claim 1, wherein
the portable information terminal is equipped with the reader/writer.

5. The equipment management system according to claim 1, comprising:
a computer configured to be disposed in a room different from the facility and to be able to transmit and receive information with the equipment position information storage unit, the equipment management data storage unit, and the image information storage unit, wherein
the computer is capable of displaying a three-dimensional image about the equipment corresponding to the virtual tag referring to the image information of the image information storage unit.

6. The equipment management system according to claim 1, wherein
the reader/writer is attached to a wearing article which a worker inspecting the equipment wears.

7. The equipment management system according to claim 2, wherein
the equipment position information storage unit has a sub virtual tag provided corresponding to a subunit configuring the equipment specified by the equipment specific information of the short-distance wireless communication medium, and
the sub virtual tag is linked to one virtual tag in the equipment position information storage unit and allows reference to at least one of the equipment management data in the equipment management data storage unit corresponding to the subunit configuring the equipment related to the linked virtual tag and the image information associated with the subunit in the image information storage unit.

8. The equipment management system according to claim 2, wherein the portable information terminal is equipped with the reader/writer.

9. The equipment management system according to claim 3, wherein the portable information terminal is equipped with the reader/writer.

10. The equipment management system according to claim 2, comprising:
a computer configured to be disposed in a room different from the facility and to be able to transmit and receive information with the equipment position information storage unit, the equipment management data storage unit, and the image information storage unit, wherein
the computer is capable of displaying a three-dimensional image about the equipment corresponding to the virtual tag referring to the image information of the image information storage unit.

* * * * *